(12) United States Patent
Harju

(10) Patent No.: US 6,334,903 B1
(45) Date of Patent: Jan. 1, 2002

(54) METHOD AND APPARATUS FOR CLEANING A MOVING SURFACE

(75) Inventor: Matti Harju, Mänttä (FI)

(73) Assignee: Metsa-Serla OYJ, Helsinki (FI)

(*) Notice: Subject to any disclaimer, the term of this patent is extended or adjusted under 35 U.S.C. 154(b) by 0 days.

(21) Appl. No.: 09/308,568

(22) PCT Filed: Nov. 20, 1997

(86) PCT No.: PCT/FI97/00711

§ 371 Date: Jun. 16, 1999

§ 102(e) Date: Jun. 16, 1999

(87) PCT Pub. No.: WO98/22652

PCT Pub. Date: May 28, 1998

(30) Foreign Application Priority Data

Nov. 21, 1996 (FI) .................................................. 964651

(51) Int. Cl.[7] .............................. B08B 1/02; B21B 45/02
(52) U.S. Cl. ................................ 134/6; 134/9; 134/15; 134/32; 15/256.5; 15/256.53
(58) Field of Search ........................... 134/6, 9, 15, 32; 15/256.5, 256.51, 256.52, 256.53

(56) References Cited

U.S. PATENT DOCUMENTS

| 5,081,950 A | | 1/1992 | Martin et al. |
| 5,363,181 A | * | 11/1994 | Lindblad et al. ............. 355/299 |

FOREIGN PATENT DOCUMENTS

| DE | 38 10085 | 10/1989 |
| FI | 11080 | 9/1924 |
| FI | 11590 | 11/1924 |
| FI | 22388 | 4/1948 |
| FI | 54076 | 6/1978 |
| WO | WO 95/00256 | 1/1995 |
| WO | WO 95/32334 | 11/1995 |

* cited by examiner

*Primary Examiner*—Zeinab El-Arini
(74) *Attorney, Agent, or Firm*—Young & Thompson

(57) ABSTRACT

Method and apparatus for cleaning a moving surface, for example a roller, wire or conveyor belt. The surface is cleaned by a doctor blade having several separate blades which move in a direction transverse to the surface to be cleaned so that the blades can be serviced and repaired during operation of the moving surface.

11 Claims, 3 Drawing Sheets

METHOD AND APPARATUS FOR CLEANING A MOVING SURFACE

This is a national stage application of PCT/FI97/00711 filed Nov. 20, 1997.

BACKGROUND OF THE INVENTION

The invention relates to a method of cleaning a moving surface, in which cleaning is performed by a doctor blade arranged against the surface to be cleaned, and in which the whole width of the moving surface is cleaned in a direction transverse to its grain direction by means of a doctor blade formed by edges of several blade means.

The invention also relates to an apparatus for cleaning a moving surface, comprising a doctor blade, supporting member arranged to support the blade and means for pressing the doctor blade against the surface to be cleaned, the doctor blade comprising several separate blade means, the edges of which are arranged to form a uniform doctor edge in a direction transverse to the grain direction of the surface to be cleaned, and the doctor edge is at least as wide as the surface to be cleaned in a direction transverse to its grain direction.

Paper, packing, plastic and textile industries use a plurality of different rollers and other cylinder-like members, e.g. drying cylinders and the like for processing products. A problem is, however, that particles from the product to be manufactured, e.g. dye, coating material, dust, fibres, etc, gradually stick on the circumference of rollers and cylinders. Particles stuck on the surface of rollers and cylinders cause problems related to quality, since impurities on the surface of the roller or the like leave marks on products. One solution to the problem is to arrange a doctor against the circumferential surface of the roller or the like, the doctor being a kind of blade which scrapes stuck impurities off.

A problem with prior art doctors is that the doctor blades wear out quickly, whereby the capacity of the doctor for separating dirt decreases considerably, which results in problems related to quality. Furthermore, if the doctor blade is worn, fibres and other impurities get between the blade and the roller, and these may burn and stick on the doctor and roller. Such impurities between the doctor and the roller may cause damage to the circumferential surface of the roller, which in turn may cause undesirable streaks in products. As a consequence, the production line has to be stopped from time to time to change new or repaired doctor blades and rollers. The removed doctor blades are cleaned and sharpened, and the rollers are ground to their shape, and their surface is smoothed for the next change.

A problem associated with the above method is that change of blades and rollers causes a stoppage in production, and furthermore, continuous service of blades and rollers increases costs considerably. An effort has been made to solve the problem by developing more durable materials for doctor blades. Experiments have been carried out by using ceramic blades, blades made of polymer and blades made of a plurality of different alloys, but the improvements have, however, been insufficient. A further solution has been to oscillate doctor blades in the direction of the roller so as to improve durability of blades and rollers. Such an apparatus has been disclosed in Finnish Patent 22388. Oscillating movement cannot, however, remove impurities stuck between the blade and the roller adequately, which causes a fault on the circumferential surface of the roller, which results in a quality defect in the product. A disadvantage common to all prior art doctors is that in order to service and maintain them in working order, a production line has to be stopped for service or for changing substitute devices. Furthermore, it has not been possible to improve the durability of doctor blades sufficiently either by developing blade materials or the oscillating movement. Finnish Patent 54076 discloses an endless, ribbon-type doctor blade. A disadvantage of this solution is that if the ribbon-type blade is damaged, e.g. a cut is formed in it, the whole blade ribbon has to be changed. Furthermore, in the ribbon-type arrangement the blade material has to be flexible, and thus e.g. ceramic blades cannot be used.

SUMMARY OF THE INVENTION

An object of this invention is to provide a new method for cleaning different moving surfaces, which allows more undisturbed production and higher production rate than the prior art solutions.

A further object of the invention is to provide a new doctor apparatus eliminating the drawbacks of the prior art.

The method of the invention is characterized in that the blade means are connected to form a closed loop, and that the blade means are moved during cleaning in a direction transverse to the grain direction of the surface to be cleaned.

The apparatus of the invention is characterized in that blade means are connected to form a closed loop and that the blade means are connected in such a manner that they can be moved in relation to the surface to be cleaned.

The basic idea of the invention is that the doctor blade comprises several smaller separate blade means, which are arranged one after another, and the edges of which form a uniform doctor edge in a direction transverse to the grain direction of the moving surface, the doctor edge being at least of the same width as the moving surface. Another idea of the invention is that the doctor blade can be moved to a special service point, where it can be serviced and repaired during the run. A further idea of an embodiment of the invention is that the blade means are connected to form a closed loop, which is arranged to move around return wheels. The basic idea of a further embodiment is that the blade means are arranged to move continuously, and the speed of the motion in a direction transverse to the surface to be cleaned can be adjusted, if necessary. At the return wheels, the blade means can be easily cleaned and the blades sharpened with an automatic sharpening unit, since the blade means are apart from one other.

An advantage of the invention is that it is not necessary to stop a production line for service and repair of the doctor, but blade means can be serviced during the run. This allows to save on costs considerably. Furthermore, moving surfaces, such as rollers, wires, belts, etc. will last longer, since they are always cleaned by a doctor which is in good condition. A further important advantage is that the quality of products improves, since there will be no variation in quality due to wearing of doctor blades and impurities. The apparatus of the invention also allows increase in the processing speed and production without interruptions.

BRIEF DESCRIPTION OF THE DRAWINGS

The invention will be described in greater detail in the accompanying drawings, in which FIG. 1 schematically shows a sectional view of an embodiment of the doctor according to the invention seen from the grain direction of the product, FIG. 2 schematically shows a sectional view of an embodiment of the doctor according to the invention seen from the end of the roller to be cleaned, FIG. 3 schematically shows a sectional view of another embodiment of the doctor according to the invention seen from the end of the roller to be cleaned.

DETAIL DESCRIPTION OF THE PREFERRED EMBODIMENTS

Figure 1:
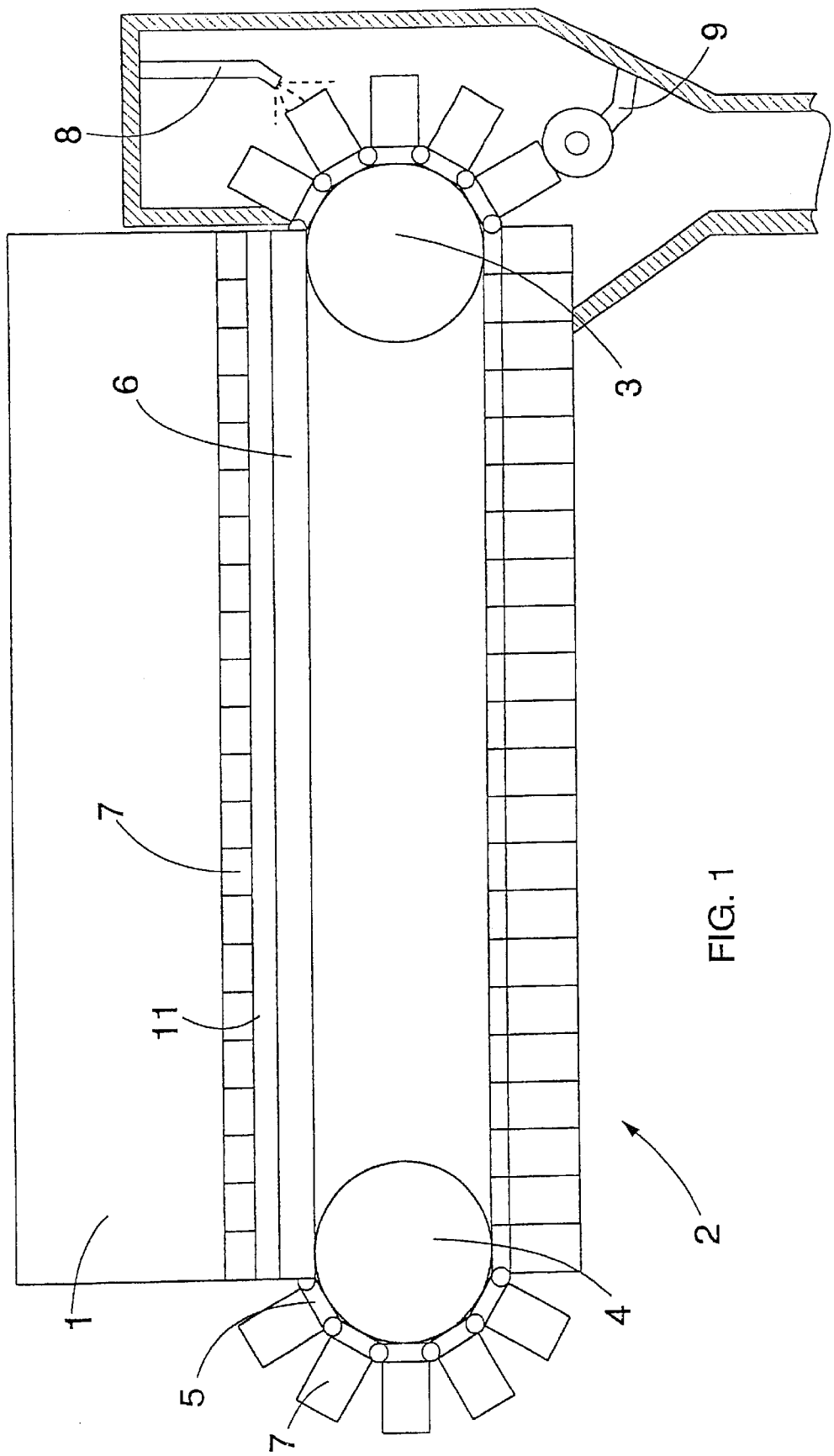

FIG. 1 schematically shows a sectional view of an embodiment of the doctor according to the invention seen from the grain direction of the product to be processed. In the example of the figure, the apparatus is arranged in a parallel direction with a surface moving continuously to the same direction so as to clean the surface of the roller 1 from material that has come off the product being manufactured and stuck on it, e.g. coating material, dye, dust, fibres or the like. An embodiment of the doctor apparatus 2 shown in FIG. 1 preferably comprises a first return wheel 3, a second return wheel 4 and a member which is arranged between said first and second return wheels 3 and 4 and forms a closed loop, preferably a chain 5, or another similar member. The blade means 7 can also be connected to one another in such a manner that they form a closed loop when connected, and in that case no separate member forming the closed loop, e.g. a chain 5, is needed. In the embodiment of the figure at least one of the return wheels uses the chain 5 and is connected by means of appropriate power transmission members to a power unit, preferably to a hydraulic motor. The chain 5 may be of any type suitable for the purpose, but preferably it is a roller chain. The chain 5 is arranged to move in such a manner that at least its upper surface, i.e. the section closest to the roller 1, is guided and supported by a guide track 6. Blade means 7 are attached to the chain 5 tightly one after another either detachably or fixedly. Adjacent blade means 7 form a uniform doctor blade as their sides are placed against one another in the straight section of the chain 5, i.e. in the section where the chain 5 is guided by the guide track 6. At the first return wheel 3 and correspondingly at the second return wheel 4 the uniform doctor edge formed by the blade means opens when it turns around the return wheels. A cleaning apparatus 8 and sharpening apparatus 9 for the blade means 7 are arranged in connection with the return wheels 3 and 4 of the doctor apparatus 2. It is most preferable to clean and repair the blade means particularly at the return wheels, when the uniform doctor edge formed by the blade means 7 is open, i.e. the sides of the blade means are apart from one another. The cleaning apparatus 8 is preferably a pressure cleaner, which by means of a shower of high-pressure water or another cleanser dissolves impurities stuck on the blade means 7 before sharpening. The cleaning apparatus 8 may also be another mechanical cleaning apparatus, which cleans the blade means either by brushing or by scraping impurities off. Impurities removed of the blade means 7 in the cleaning process can be sucked away so that they cannot return to the process. The sharpening apparatus 9 preferably comprises an automatic grinding apparatus for sharpening and repairing the blade means 7. Reference numeral 11 in the figure denotes a supporting doctor.

Figure 2:
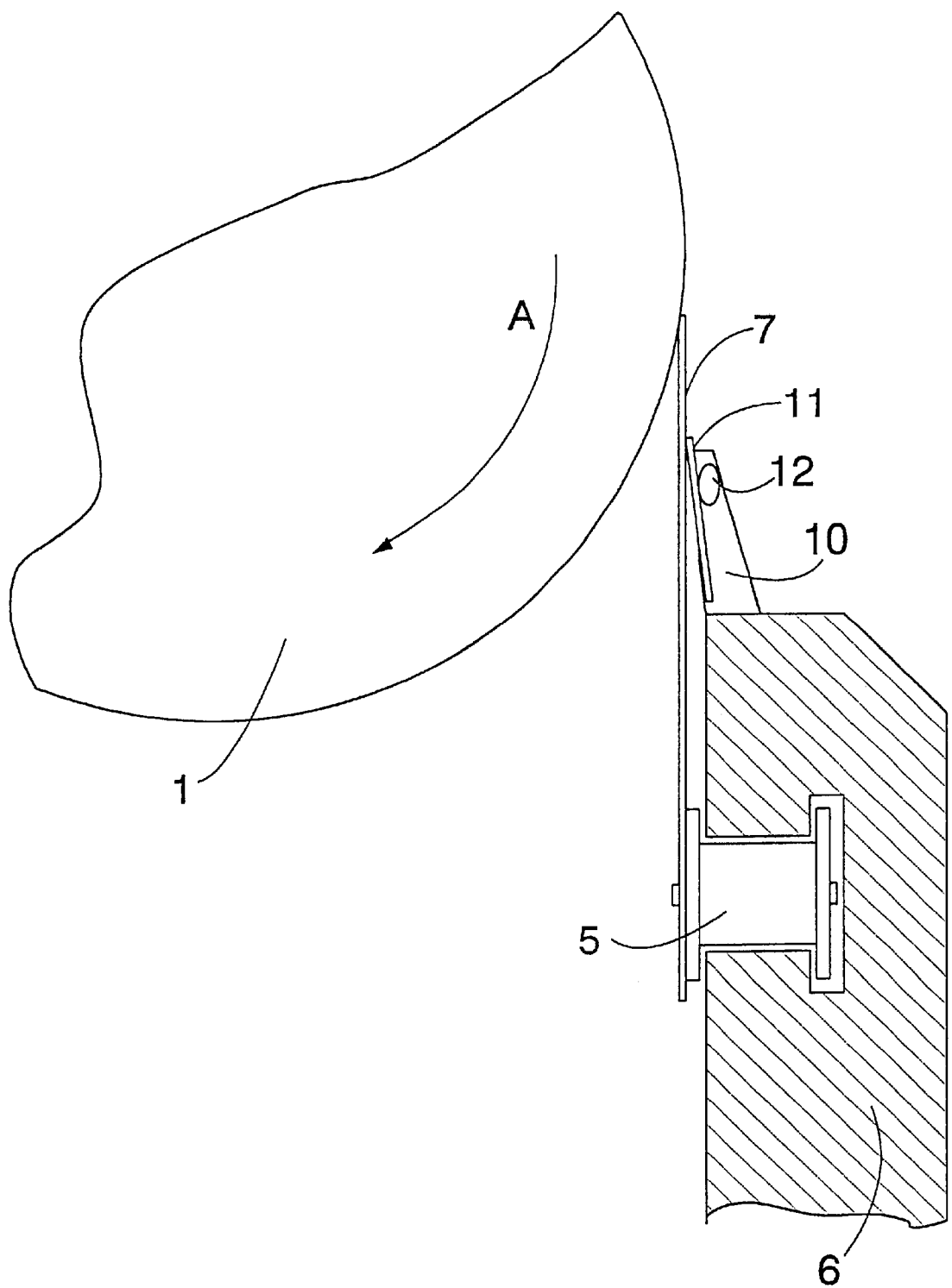

FIG. 2 schematically shows a sectional view of a doctor apparatus according to FIG. 1 seen from the end of the roller to be cleaned. In FIG. 2 the same numbers have the same significance as in the previous figure. A blade means 7 is arranged to clean the cylinder-like circumferential surface of the roller 1 substantially in the direction of the tangent of the circumferential, when the roller 1 is arranged to rotate in the direction of arrow A. The blade means 7 is attached to the chain 5 preferably by means of the stitch rivets of the chain 5. The chain 5 is arranged to move so that it is guided and supported by the guide track 6. The guide track 6 is a stationarily arranged supporting member which is at least of the same width as the surface to be cleaned, and a fixed cam 10 and a turning supporting doctor 11 are attached to it. Furthermore, a transfer member 12 is arranged in connection with the guide track 6, which provides power for pressing the support doctor 11 against the blade means 7, whereby the blade means 7 press against the surface to be cleaned. The transfer member 12 is preferably a member, e.g. hose bellows or the like, which expands due to pressurized air or fluid pressure and is arranged between the cam 10 and the supporting doctor 11. By adjusting the pressing force it is possible to influence the cleaning result. The blade means 7 are quadrangular, preferably rectangular metallic or ceramic members or of some other suitable material, and their edge opposite to the fixed end is arranged against the surface to be cleaned. One side of each blade means 7 may be convex and the other concave, whereby adjacent blade means 7 are substantially at the same level and placed tightly against one another. Thus they form a uniform doctor edge in a direction transverse to the grain direction of the surface to be cleaned. The doctor edge is at least of the same width as the moving surface in a direction transverse to its grain direction.

Figure 3:
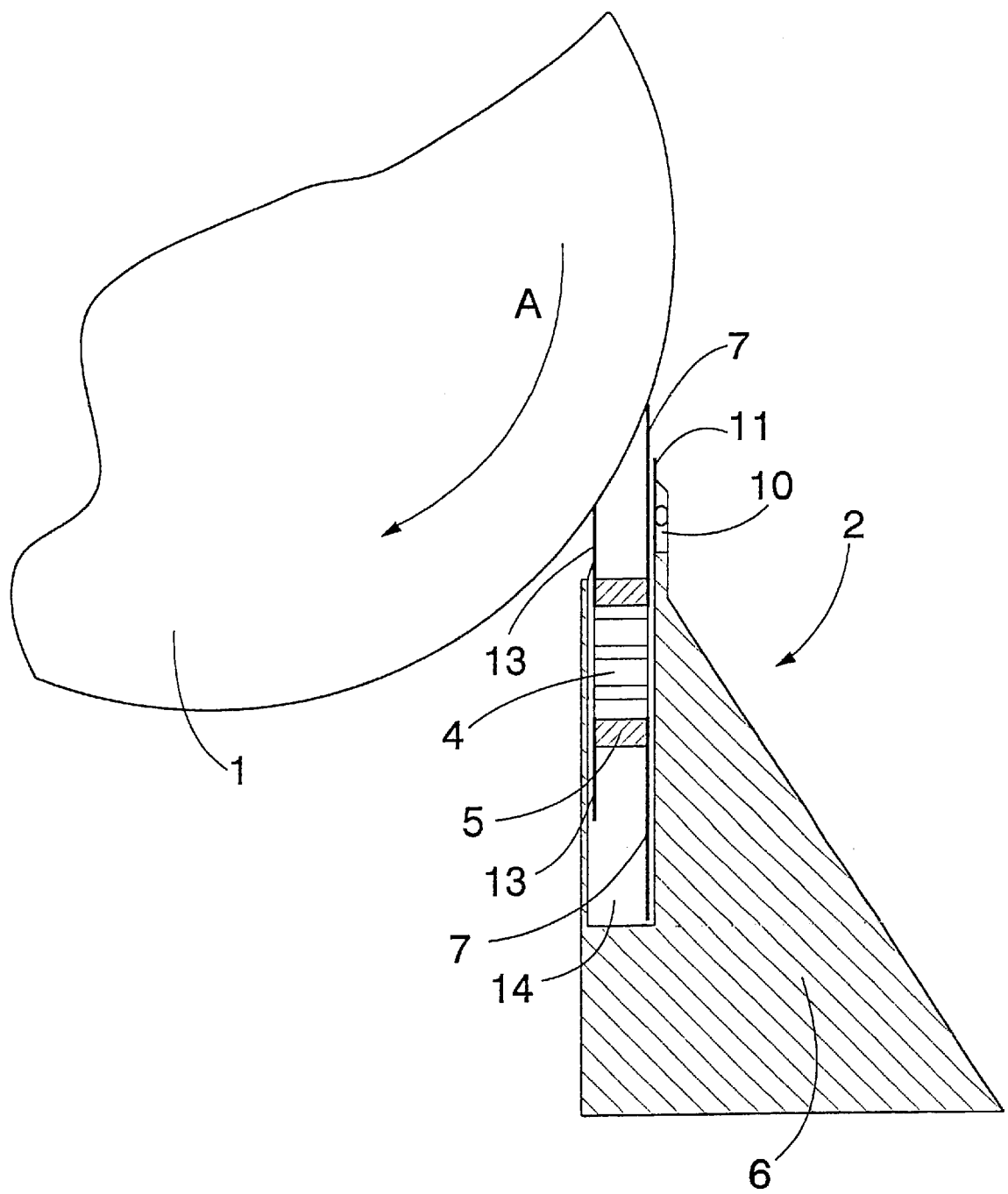

FIG. 3 schematically shows a sectional view of another embodiment of the doctor according to the invention seen from the end of the cylinder to be cleaned. The same numbers have the same significance as in the previous figures, and the grain direction of the surface to be cleaned is indicated by arrow A. In the embodiment of FIG. 3 a doctor apparatus 2 is arranged to clean the roller 1, differing from the apparatus shown in FIG. 2 in that, in addition to the blade means 7, back doctor means 13 are provided on the other side of the chain 5. The back doctor means are cleaning members which can be similar to the blade means 7 and attached similarly to the chain. Like the actual doctor blade, the back doctor blade comprises several sheet-like members, which form a uniform doctor edge when their sides are placed against one another. The purpose of the back doctor is to make cleaning of a moving surface even more effective. The guide track 6 preferably provides sufficient support for the back doctor. The structure of the doctor apparatus 2 shown in FIG. 3 is rather compact and small, since the guide track 6 forms a kind of body to which the return wheels are attached. The figure shows one of the return wheels 4. Furthermore, the guide track 6 comprises a channel 14, where the chain 5 with the blade means 7 and back doctor means 13 attached to it can move. It is also possible to arrange necessary means for repairing the blade means in connection with the channel 14. As in FIG. 2, the structure also comprises a cam 10, supporting doctor 11 and a member for pressing the support doctor 11 against the blade means 7. Furthermore, the back doctor means 13 are repaired as the blade means 7 by means of the cleaning and sharpening apparatuses. In the embodiment shown in FIG. 3 it is not necessary to use a chain 5 as the member forming the loop, but the member may also be of some other type, or there is no member forming a closed loop at all, whereby the blade means 7 and the back doctor means 13 are respectively connected to one another to form a closed loop.

The drawings and the related description are only intended to illustrate the idea of the invention. The details of the invention may vary within the appended claims. Thus the doctor of the invention is not limited only to cleaning of rollers and other cylinder-type members, but is also suitable for cleaning other kind of moving surfaces, such as wires, conveyor belts and the like. Furthermore, the doctor apparatus can be such an apparatus in which the blade means are interdigitated in two rows in such a manner that their edges partially overlap, and thus form a uniform doctor edge in a direction transverse to the grain direction of the moving surface. Such a two-row doctor apparatus can be arranged transversely against the moving surface, or if it is arranged in the same way as the single-row doctor apparatus, the blade means are of different lengths at different levels. The arrangement can also comprise several return wheels and the chain can be supported by rolls or other appropriate members. It is further possible to implement transfer of blade means in relation to the surface to be cleaned sequentially, i.e. blade means are transferred for repair one section at a time, and these can be simultaneously replaced with repaired blade means. When the blade means do not move, damaged blade means can be replaced with new blade means.

I claim:

1. A method of cleaning a moving surface comprising the steps of:

placing a doctor blade against the moving surface to be cleaned, said doctor blade being a closed loop and comprising plural blades; and moving said doctor blade in a direction transverse to a direction of movement of the moving surface to clean a whole width of the moving surface.

2. The method as claimed in claim 1, further comprising the steps of cleaning and servicing said plural blades during operation of the surface to be cleaned.

3. An apparatus for cleaning a moving surface, comprising:

a movable first doctor blade that is a closed loop and comprises plural separate first blades that move in relation to a surface to be cleaned and that have edges;

a supporting member arranged and adapted to support said first doctor blade to press the edges against a surface to be cleaned, said edges of said plural separate first blades forming a uniform doctor edge in a direction transverse to a direction of movement of the surface to be cleaned, said doctor edge being at least as wide as the surface to be cleaned.

4. The apparatus as claimed in claim 3, further comprising a connection member having a form of a closed loop, said first blades being attached to a first side of said connection member.

5. The apparatus as claimed in claim 4, further comprising a second doctor blade comprising second blades attached to a second side of said connection member, said first and second doctors being at different levels with respect to the surface to be cleaned.

6. The apparatus as claimed in claim 3, wherein said first blades contact the surface to be cleaned as a single row with respect to the surface to be cleaned.

7. The apparatus as claimed in claim 3, wherein said first blades are interdigitated at two rows in such a manner that respective edges of said first blades overlap.

8. The apparatus as claimed in claim 3, wherein said supporting member is a supporting doctor, and said supporting doctor is arranged and adapted to press said first blades against the surface to be cleaned by a transfer member.

9. The apparatus as claimed in claim 3, further comprising a cleaning apparatus and a sharpening apparatus arranged and adapted to clean and repair said first blades.

10. The apparatus of claim 3, further comprising a drive wheel that moves said first doctor blade transverse to the direction of movement of the surface to be cleaned.

11. The apparatus of claim 3, wherein said first blades are connected to each other to form said closed loop.

* * * * *